United States Patent [19]

Klaucke et al.

[11] Patent Number: 5,002,019
[45] Date of Patent: Mar. 26, 1991

[54] RADIATOR ARRANGEMENT, PARTICULARLY FOR COOLING THE ENGINE OF COMMERCIAL VEHICLES

[75] Inventors: Thomas Klaucke, Renningen; Hermann Ochaba, Waiblingen, both of Fed. Rep. of Germany

[73] Assignee: Suddeutsche Kuhlerfabrik Julius Fr. Behr GmbH & Co. KG, Fed. Rep. of Germany

[21] Appl. No.: 472,955

[22] Filed: Jan. 31, 1990

[30] Foreign Application Priority Data

Feb. 3, 1989 [DE] Fed. Rep. of Germany ....... 3903199

[51] Int. Cl.⁵ .............................................. F01P 7/10
[52] U.S. Cl. .............................. 123/41.49; 123/41.12; 29/890.03; 165/51
[58] Field of Search ............... 123/41.04, 41.11, 41.12, 123/41.49; 165/32, 51; 417/18, 22, 46; 236/35; 29/428, 890.03

[56] References Cited

U.S. PATENT DOCUMENTS

| | | | |
|---|---|---|---|
| 3,377,023 | 4/1968 | Costa et al. ............................. | 236/35 |
| 4,124,001 | 11/1978 | Samuel et al. ..................... | 123/41.12 |
| 4,378,760 | 4/1983 | Barge ................................ | 123/41.49 |
| 4,479,532 | 10/1984 | Watanabe ......................... | 123/41.12 |

FOREIGN PATENT DOCUMENTS

| | | |
|---|---|---|
| 2233737 | 1/1973 | Fed. Rep. of Germany . |
| 2550481 | 9/1978 | Fed. Rep. of Germany . |
| 3714842 | 11/1988 | Fed. Rep. of Germany . |
| 57-198311 | 12/1982 | Japan ................................ 123/41.49 |

*Primary Examiner*—Noah P. Kamen
*Attorney, Agent, or Firm*—Evenson, Wands, Edwards, Lenahan & McKeown

[57] ABSTRACT

A radiator arrangement is disclosed which avoids problems of known radiator arrangements where it is customary to manufacturer a radiator and fan unit and to subsequently connect an electric control device with the heat exchanger and the fan drive and to equip the unit with temperature sensors during assembly on a vehicle. It is disclosed to fasten the control device and the temperature sensor directly to the structural unit formed by the heat exchanger and the fan arrangement. As a result of this construction, the whole radiator arrangement can still be adjusted in the manufacturing plant prior to movement of same to a location where the radiator/fan unit is assembled on a further vehicle part.

22 Claims, 3 Drawing Sheets

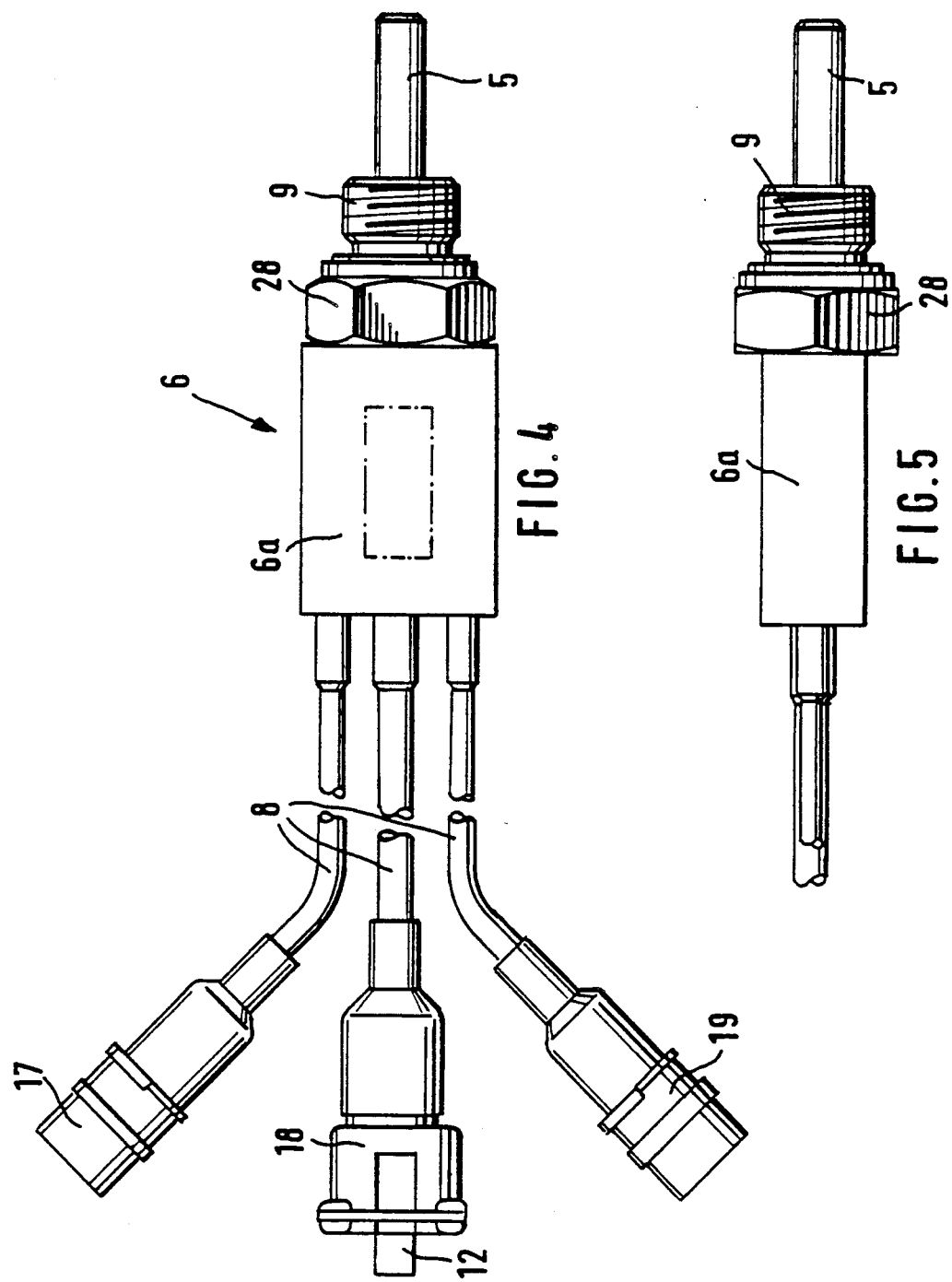

RADIATOR ARRANGEMENT, PARTICULARLY FOR COOLING THE ENGINE OF COMMERCIAL VEHICLES

BACKGROUND AND SUMMARY OF THE INVENTION

The invention relates to a radiator arrangement of the type having a fan with a variable fan drive, at least one heat exchanger arranged in front of the fan for exchanging heat between engine coolant and air taken in by the fan, a temperature sensor for the engine coolant, and an electric control device which controls the fan drive as a function of the temperature sensed by the temperature sensor.

Radiator arrangements of this type are known (DE-37 14 842 AI-P 80 01). In the known constructions, the electric control device, which is part of the vehicle, is always connected with the heat exchanger and the fan drive subsequently, the corresponding temperature sensors also not being installed before the control device is connected. In the case of vehicles which are equipped with a radiator arrangement of the type referred to above, the control device is generally located in an area situated outside the engine compartment, such as the driver's cab. In constructions of this type, it is therefore a disadvantage that the coordination of the desired control characteristics and the adjusting of the control device required for this purpose and possibly of other existing components of the control system can only be carried out at the customer's after the installation of the radiator. This is relatively expensive and, more importantly, does not always result in the adjustment of the desired control characteristics of the radiator.

An object of the invention is to develop a radiator arrangement of the initially mentioned type in such a manner that also the future operating method of the radiator can also be determined by the radiator manufacturer. For achieving this object, the radiator arrangement is constructed with the heat exchanger and fan combined as a structural unit, wherein the electric control device and the temperature sensor and associated connecting lines are fastened directly to the structural unit. By means of this development, the control device with all its connecting lines and temperature sensors becomes part of the structural unit which can be preassembled and which comprises the fan and the heat exchanger. Therefore, the whole radiator arrangement can be adjusted before its delivery. The only measure that is still required is the electrical connection of the control device or its connection with additional sensors which, however, can be achieved in a simple manner and advantageously with respect to the assembling by means of the arrangement of plug elements.

Advantageous further developments are provided in preferred embodiments of the invention, including deposition of the temperature sensor directly at the housing for the control device, which housing is threadably attachable in an opening in the radiator tank of the heat exchanger. This arrangement provides the advantage that no connecting lines exist between the control device and the temperature sensor assigned to the cooling circulating system of the heat exchanger which may be subjected to outside influences. The control device and the temperature sensor constitute a structural unit which can be screwed in and which, in a simple manner, by means of connecting cables, may lead to additional signal generators and to the power connection.

In especially preferred embodiments, the preassembled radiator arrangement can also be used for the control of the cooling water temperature as well as for the control of other quantities, such as the air temperature of the charge air. For this purpose, the control device can implement corresponding characteristic curves for water and air temperatures. Finally, the advantage is also achieved in certain preferred embodiments, of the direct and determinable assignment of the rotational fan speed to certain cooling water temperatures or outside temperatures with the rotational speed of the fan monitored directly. A relatively expensive control device can therefore be integrated originally into the structural radiator unit. This radiator unit can be laid out correspondingly at the manufacturer's so that during the assembly, a cumbersome adjustment of the control system becomes superfluous.

Other objects, advantages and novel features of the present invention will become apparent from the following detailed description of the invention when considered in conjunction with the accompanying drawings.

BRIEF DESCRIPTION OF THE DRAWINGS

FIG. 4 is an enlarged partial representation in top view of the control device used in the case of the radiator of FIGS. 1 to 3; and FIG. 5 is a lateral view of the control device of FIG. 4.

DETAILED DESCRIPTION OF THE DRAWINGS

Figure 1:
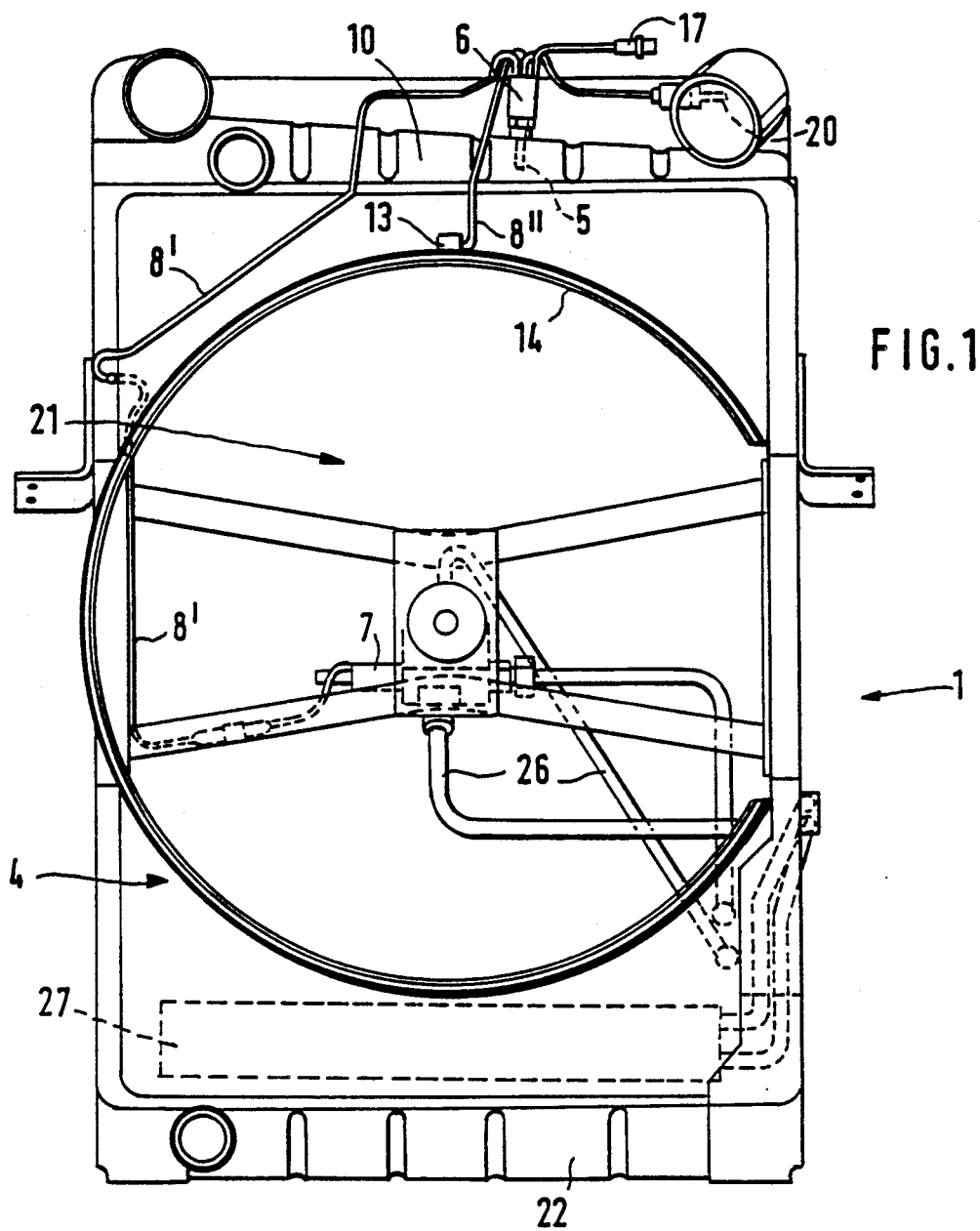
FIG. 1 is a front schematic view of a radiator of a commercial vehicle which is equipped according to a preferred embodiment of the invention.
Figure 2:
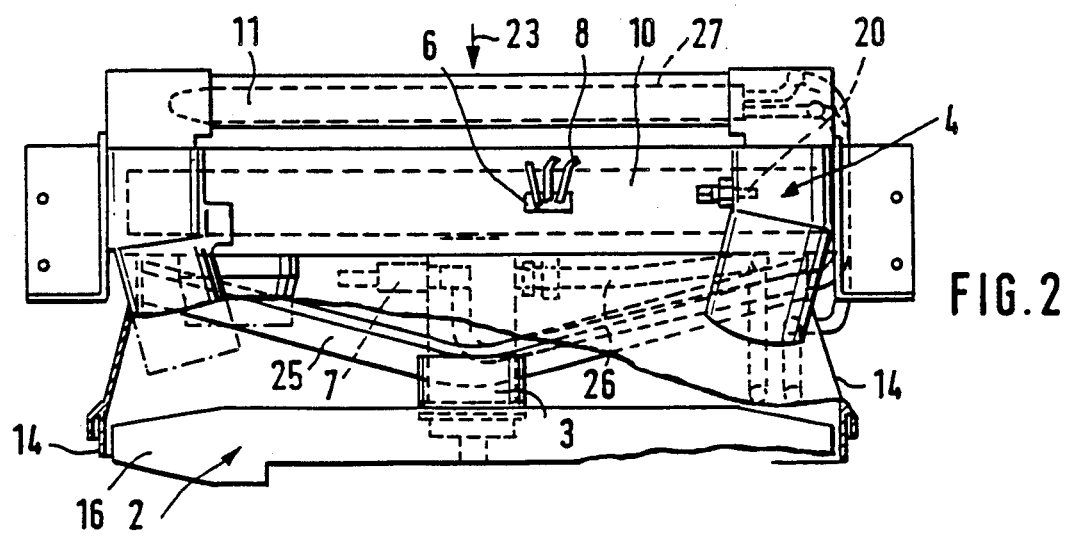
FIG. 2 is a top view of the radiator of FIG. 1.
Figure 3:
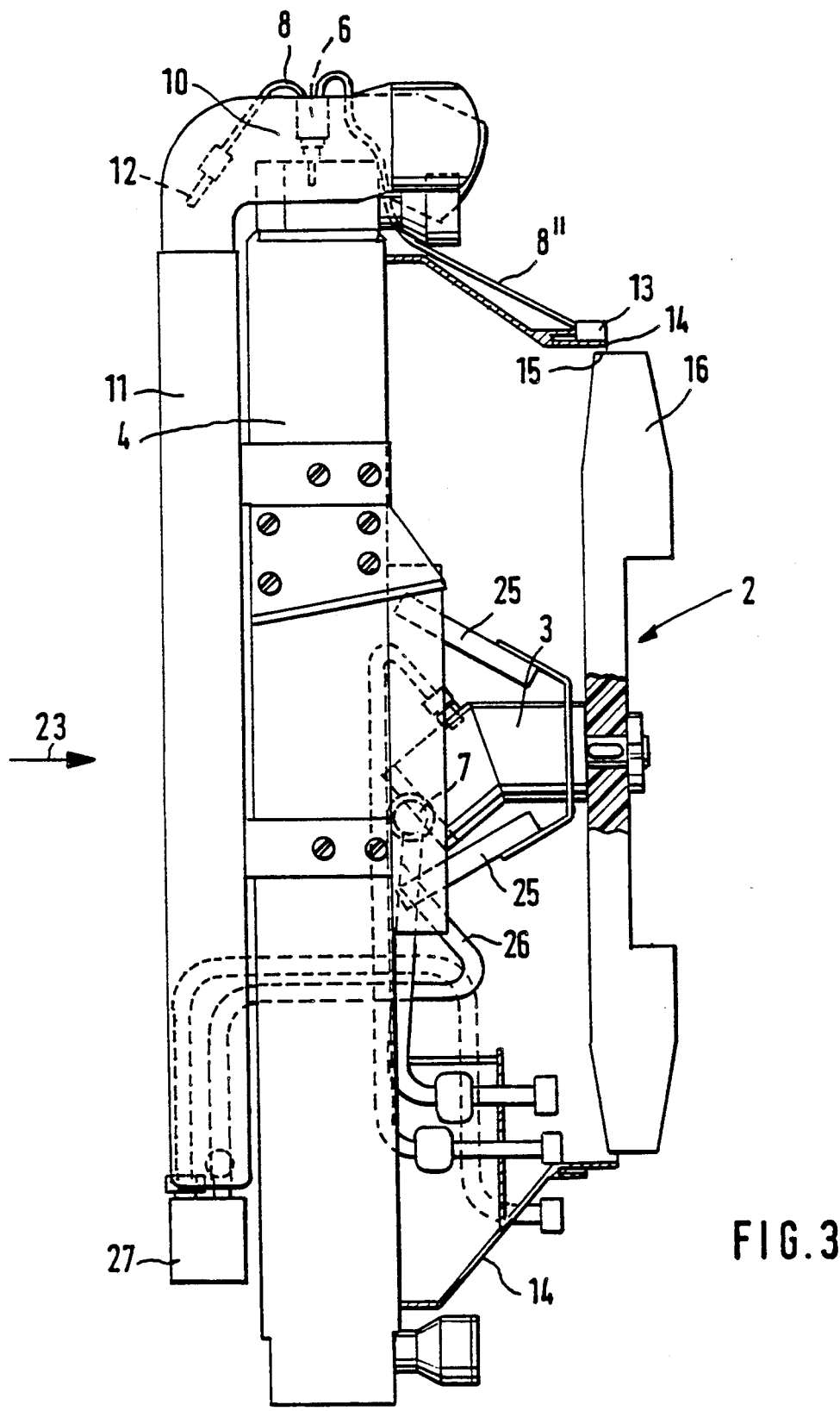
FIG. 3 is a lateral view of the radiator of FIGS. 1 and 2.

FIGS. 1 to 3 show a radiator arrangement in the form of a structural unit 1 which comprises a known heat exchanger 4 having a gilled-tube block 21 with a radiator tank 10 and a collector tank 22 as well as of a fan arrangement 2 which is connected behind this heat exchanger 4 in the direction 23 of the flowing air. The fan arrangement 2 with respect to its details is also constructed in a known manner. A fan 2 is provided which is equipped with fan blades 16 and which can be controlled in its rotational speed by means of a hydraulic fan drive 3. In this case, the driving speed is determined by means of a control element 7 in the form of a control valve which controls the supply of hydraulic medium to the fan drive 3 as a function of the temperature of the cooling water in the heat exchanger 4.

By means of a fan cowl 14, the fan arrangement 2 is fixedly connected with a frame of the heat exchanger 4. The fan drive 3 is also held at the frame of the heat exchanger 4 by means of supporting arms 25. By way of hydraulic pipes 26, which are connected with the storage device for the hydraulic medium and with a pump in a manner which is not shown in detail, and otherwise also lead to an oil cooler 27, the fan drive 3 is connected with a hydraulic circulating system. As mentioned, the supply of the hydraulic medium is determined by way of a control element 7 constructed as a control valve.

A control device 6, which is shown in detail in FIGS. 4 and 5, is fixedly connected with the radiator tank 10 of the heat exchanger 4. The electric control device 6 has a housing 6a in which the required electric control circuits are contained, for example, in the form of insert cards or the like. By means of a hexagon 28 and a thread 9, the housing can be inserted into a corresponding opening in the radiator tank 10 so that the control device 6 is fixedly connected with the radiator tank 10 and with the heat exchanger 4. In the embodiment shown, a temperature sensor 5 is integrated into the control device 6, this temperature sensor 5 being surrounded by the thread 9 and therefore, when the control device housing 6a is screwed into the radiator tank 6, dipping into the water circulating system of the heat exchanger 4. The temperature of the cooling water in the heat exchanger 4 is therefore measured directly by the screwed-in control device 6 which, by means of electric connecting lines 8, which are mounted directly at the housing 6a, can also be connected with other signal generators. In the case of the embodiment in which other heat exchangers 11 are connected in front of the heat exchanger 4 in the form of a charge air cooler, a temperature sensor 20 is provided which projects into the outlet tube of the charge air cooler, measures the temperature of the charge air and which, by means of a connecting part 18, is connected directly with the assigned line 8 and with the control device 6. Other connecting lines 8 lead to a plug 17 for the power connection of the control device and to a plug 19 which leads to a connecting line 8' to the control element 7. Embodiments are also contemplated where the control element 7 is directly connected with the control device 6 by way of a connecting line 8.

FIGS. 4 and 5 do not show another connecting line to the control device 6. The reason is that the control device 6, by means of an electric connecting line 8", is connected with a signal generator 13 in the form of a pulse counter which is fixedly arranged at the shroud 14 of the fan 2 in the area of the rotating ventilator. A magnetically acting part 15 is also assigned to one of the fan blades 16, such as a small permanent magnet or an iron plate which, when the fan 2 is rotated moves past the pulse counter 13 at certain intervals, and thus permits an exact determination of the rotational speed of the fan 2 which in the control device, in turn, can be utilized for a coordination of the desired control characteristics. Also in a known manner, the fan blades 16 move inside the cowl 14 serving as the fan shroud, in the area of which the pulse counter 13 is mounted.

As a result of the use of the pulse counter 13 and its connection to the control device, data exist concerning the actual rotational speed of the fan. Nevertheless, the control device 6, as mentioned, with all its connecting lines 8, 8', 8" and other signal generators in the form of temperature sensors 20 or of an additional outside-temperature sensor 12 as well as the pulse generator 13 is part of the constructional unit 1 of the overall radiator aggregate which only has to be installed into the vehicle. The electric connection of the control device 6 can take place by means of the plug 17. Other mounting or adjusting work is not required.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A radiator arrangement, particularly for cooling the engine of commercial vehicles, comprising:
    a fan with a variable speed hydraulic fan drive,
    a fan drive control unit for controlling the supply of hydraulic fluid to vary the speed of the fan drive,
    a heat exchanger arranged in front of the fan drive for exchanging heat between engine coolant and air taken in by the fan,
    a temperature sensor for sensing the coolant temperature,
    and an electric control device for controlling the fan drive control unit as a function of the temperature sensed by the temperature sensor,
    wherein the heat exchanger, the fan and the fan drive control unit are combined as a pre-assembled structural unit, and wherein the electric control device and the temperature sensor and associated connecting lines are fastened directly to the structural unit.

2. A radiator arrangement according to claim 1, wherein the temperature sensor is arranged directly at a housing of the control device, and wherein the housing is fastened to the heat exchanger.

3. A radiator arrangement according to claim 2, wherein the housing is inserted by means of a thread surrounding the temperature sensor, into an opening of a radiator tank of the heat exchanger.

4. A radiator arrangement according to claim 3, wherein an outside-temperature sensor is provided which senses the temperature of the cooling air entering into the structural unit and is connected with the control device.

5. A radiator according to claim 4, wherein all signal generators are cabled to the control device.

6. A radiator arrangement according to claim 2, comprising at least one additional heat exchanger, wherein a temperature sensor signal generator is provided which is assigned to the additional heat exchanger, said temperature sensor signal generator being arranged in the flow path of the charge air and being fixedly cabled to the control device.

7. A radiator arrangement according to claim 2, wherein all signal generators are cabled to the control device.

8. A radiator arrangement according to claim 1, comprising at least one additional heat exchanger, wherein a temperature sensor signal generator is provided which is assigned to the additional heat exchanger, said temperature sensor signal generator being arranged in the flow path of the charge air and being fixedly cabled to the control device.

9. A radiator arrangement according to claim 8, wherein an outside-temperature sensor is provided which senses the temperature of the cooling air entering into the structural unit and is connected with the control device.

10. A radiator arrangement according to claim 1, wherein an outside-temperature sensor is provided which senses the temperature of the cooling air entering into the structural unit and is connected with the control device.

11. A radiator arrangement according to claim 1, wherein a signal generator is assigned to the fan which measures its rotational speed, said signal generator being connected with the control device.

12. A radiator arrangement according to claim 11, wherein a pulse counter is provided as the signal generator which is arranged in the area of a fan shroud and interacts with a magnetically acting part in one of fan blades.

13. A radiator arrangement, particularly for cooling the engine of commercial vehicles, comprising:
a fan with a variable speed fan drive,
a heat exchanger arranged in front of the fan drive for exchanging heat between engine coolant and air taken in by the fan,
a temperature sensor for sensing the coolant temperature,
and an electric control device for controlling the fan drive as a function of the temperature sensed by the temperature sensor,
wherein the heat exchanger and the fan are combined as a structural unit, wherein the electric control device and the temperature sensor and associated connecting lines are fastened directly to the structural unit,
wherein the temperature sensor is arranged directly at a housing of the control device, and wherein the housing is fastened to the heat exchanger,
and wherein the housing is inserted by means of a thread surrounding the temperature sensor, into an opening of a radiator tank of the heat exchanger.

14. A radiator arrangement, particularly for cooling the engine of commercial vehicles, comprising:
a fan with a variable speed fan drive,
a heat exchanger arranged in front of the fan drive for exchanging heat between engine coolant and air taken in by the fan,
a temperature sensor for sensing the coolant temperature,
and at least one additional heat exchanger,
an electric control device for controlling the fan drive as a function of the temperature sense by the temperature sensor,
wherein the heat exchangers and the fan are combined as a structural unit, wherein the electric control device and the temperature sensor and associated connecting lines are fastened directly to the structural unit,
wherein a temperature sensor signal generator is provided which is assigned to the additional heat exchanger, said temperature of sensor signal generator being arranged in the flow path of the charge air and being fixedly cabled to the control device.

15. A radiator arrangement, particularly for cooling the engine of commercial vehicles, comprising:
a fan with a variable speed fan drive,
a heat exchange arranged in front of the fan drive for exchanging heat between engine coolant and air taken in by the fan,
a temperature sensor for sensing the coolant temperature,
and an electric control device for controlling the fan drive as a function of the temperature sensed by the temperature sensor,
wherein the heat exchanger and the fan are combined as a structural unit, wherein the electric control device and the temperature sensor and associated connecting lines are fastened directly to the structural unit,
and wherein a signal generator is assigned to the fan which measures its rotational speed, signal generator being connected with the control device.

16. A radiator arrangement, particularly for cooling the engine of commercial vehicles, comprising:
a fan with a variable speed fan drive,
a heat exchanger arranged in front of the fan drive for exchanging heat between engine coolant and air taken in by the fan,
a temperature sensor for sensing the coolant temperature,
and an electric control device for controlling the fan drive as a function of the temperature sensed by the temperature sensor,
wherein the heat exchanger and the fan are combined as a structural unit, wherein the electric control device and the temperature sensor and associated connecting lines are fastened directly to the structural unit,
wherein the temperature sensor is arranged directly at a housing of the control device, and wherein the housing is fastened to the heat exchanger,
and wherein all signal generators are cabled to the control device.

17. A method of manufacturing a radiator arrangement, particularly a radiator arrangement for cooling the engine of commercial vehicles of the type including:
a fan with a variable speed hydraulic fan drive,
a fan drive control unit for controlling the supply of hydraulic fluid to vary the speed of the fan drive,
a heat exchanger arranged in front of the fan drive for exchanging heat between engine coolant and air taken in by the fan,
a temperature sensor for sensing the coolant temperature,
and an electric control device for controlling the fan drive control unit as a function of the temperature sensed by the temperature sensor,
said method comprising combining the heat exchanger, the fan, and the fan drive control unit into a pre-assembled structural unit, and subsequently installing the pre-assembled structural unit in a commercial vehicle with the electrical control device and the temperature sensor and associated connecting lines being fastened directly to the pre-assembled structural unit.

18. A method according to claim 17, wherein the temperature sensor is arranged directly at a housing of the control device, and wherein the housing is fastened to the heat exchanger.

19. A method according to Claim 18, wherein the housing is inserted by means of a thread surrounding the temperature sensor, into an opening of a radiator tank of the heat exchanger.

20. A method according to claim 17, further comprising installing at least one additional heat exchanger and providing a temperature sensor signal generator assigned to the additional heat exchanger such that said temperature sensor signal generator is arranged in the flow path of charge air and is fixedly cabled to the control device.

21. A method according to claim 17, wherein a signal generator is assigned to the fan which measures its rotational speed, said signal generator being connected with the control device.

22. A method according to claim 21, wherein a pulse counter is provided as the signal generator which is arranged in the area of a fan shroud and interacts with a magnetically acting part in one of fan blades.

* * * * *